(12) United States Patent
Ohtake

(10) Patent No.: US 9,071,774 B2
(45) Date of Patent: Jun. 30, 2015

(54) CONTROL DEVICE, IMAGE OUTPUT APPARATUS, IMAGE OUTPUT SYSTEM, NON-TRANSITORY COMPUTER READABLE MEDIUM, AND CONTROL METHOD

(71) Applicant: FUJI XEROX CO., LTD., Tokyo (JP)

(72) Inventor: Shin Ohtake, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 154 days.

(21) Appl. No.: 13/624,155

(22) Filed: Sep. 21, 2012

(65) Prior Publication Data

US 2013/0250351 A1    Sep. 26, 2013

(30) Foreign Application Priority Data

Mar. 23, 2012 (JP) ................................ 2012-067431

(51) Int. Cl.
- G06F 3/12 (2006.01)
- H04N 1/32 (2006.01)
- H04L 29/12 (2006.01)
- H04N 1/00 (2006.01)

(52) U.S. Cl.
CPC .............. H04N 1/32 (2013.01); H04N 1/00222 (2013.01); H04N 1/32625 (2013.01); H04N 1/32662 (2013.01); H04L 61/103 (2013.01)

(58) Field of Classification Search
None
See application file for complete search history.

(56) References Cited

U.S. PATENT DOCUMENTS

| | | | |
|---|---|---|---|
| 6,075,776 A | | 6/2000 | Tanimoto et al. |
| 2003/0067622 A1* | | 4/2003 | Toyoda et al. ............... 358/1.14 |
| 2006/0221391 A1* | | 10/2006 | Okazawa et al. ........... 358/1.15 |
| 2009/0080447 A1* | | 3/2009 | Sawada et al. ................ 370/401 |
| 2011/0202956 A1* | | 8/2011 | Connelly et al. ................ 725/38 |

FOREIGN PATENT DOCUMENTS

JP    A-10-56473    2/1998

* cited by examiner

Primary Examiner — Vincent Rudolph
Assistant Examiner — John Wallace
(74) Attorney, Agent, or Firm — Oliff PLC

(57) ABSTRACT

A control device includes a first acquisition unit that acquires a first notification reservation request which requests a notification reservation of an event and includes first identification information for identifying a notification destination of the event, a second acquisition unit that acquires a second notification reservation request which requests a notification reservation of an event and includes second identification information for identifying a notification destination of the event, and a first controller that performs a control such that information regarding the notification reservation of the event requested by the second notification reservation request is stored in a memory according to a difference between the first identification information and the second identification information.

3 Claims, 17 Drawing Sheets

MANAGEMENT RULE TABLE

| | | IP ADDRESS | |
|---|---|---|---|
| | | SAME | DIFFERENT |
| MAC ADDRESS | SAME | UPDATE REGISTERED NOTIFICATION RESERVATION VALIDITY PERIOD TO ACQUIRED NOTIFICATION RESERVATION REQUEST VALIDITY PERIOD | UPDATE REGISTERED NOTIFICATION RESERVATION VALIDITY PERIOD AND IP ADDRESS TO ACQUIRED NOTIFICATION RESERVATION REQUEST VALIDITY PERIOD AND IP ADDRESS |
| | DIFFERENT | DELETE REGISTERED NOTIFICATION RESERVATION AND REGISTER NEW NOTIFICATION RESERVATION REQUESTED BY ACQUIRED NOTIFICATION RESERVATION REQUEST | REGISTER NEW NOTIFICATION RESERVATION REQUESTED BY ACQUIRED NOTIFICATION RESERVATION REQUEST |

FIG. 4

| TRANSMISSION DESTINATION MAC ADDRESS | TRANSMISSION SOURCE MAC ADDRESS | TRANSMISSION DESTINATION IP ADDRESS | TRANSMISSION SOURCE IP ADDRESS | VALIDITY PERIOD | KIND OF EVENT |
|---|---|---|---|---|---|

NOTIFICATION RESERVATION REQUEST

FIG. 6

NOTIFICATION RESERVATION INFORMATION 221

| NOTIFICATION RESERVATION ID | VALID/ INVALID FLAG | TRANSMISSION DESTINATION IP ADDRESS | TRANSMISSION DESTINATION MAC ADDRESS | VALIDITY PERIOD (sec) | KIND OF EVENT |
|---|---|---|---|---|---|
| 1 | VALID | 192.168.1.1 | D4-85-64-B4-EE-EB | 1200 | PROBLEM IN IMAGE OUTPUT |
| 2 | INVALID | 192.168.1.1 | D4-85-64-B4-EE-EB | 1200 | COMPLETION OF IMAGE OUTPUT PROCESS |
| 3 | VALID | 192.168.1.2 | D4-85-64-B4-EE-EC | 2400 | PROBLEM IN IMAGE OUTPUT |
| 4 | INVALID | 192.168.1.2 | D4-85-64-B4-EE-EC | 2400 | COMPLETION OF IMAGE OUTPUT PROCESS |
| 5 | VALID | 192.168.1.3 | D4-85-64-B4-EE-ED | 3600 | PROBLEM IN IMAGE OUTPUT |
| 6 | INVALID | 192.168.1.3 | D4-85-64-B4-EE-ED | 3600 | COMPLETION OF IMAGE OUTPUT PROCESS |
| ... | ... | ... | ... | ... | ... |

FIG. 8

| | | IP ADDRESS | |
| --- | --- | --- | --- |
| | | SAME | DIFFERENT |
| MAC ADDRESS | SAME | UPDATE REGISTERED NOTIFICATION RESERVATION VALIDITY PERIOD TO ACQUIRED NOTIFICATION RESERVATION REQUEST VALIDITY PERIOD | UPDATE REGISTERED NOTIFICATION RESERVATION VALIDITY PERIOD AND IP ADDRESS TO ACQUIRED NOTIFICATION RESERVATION REQUEST VALIDITY PERIOD AND IP ADDRESS |
| | DIFFERENT | DELETE REGISTERED RESERVATION AND REGISTER NEW NOTIFICATION RESERVATION REQUESTED BY ACQUIRED NOTIFICATION RESERVATION REQUEST | REGISTER NEW NOTIFICATION RESERVATION REQUESTED BY ACQUIRED NOTIFICATION RESERVATION REQUEST |

MANAGEMENT RULE TABLE

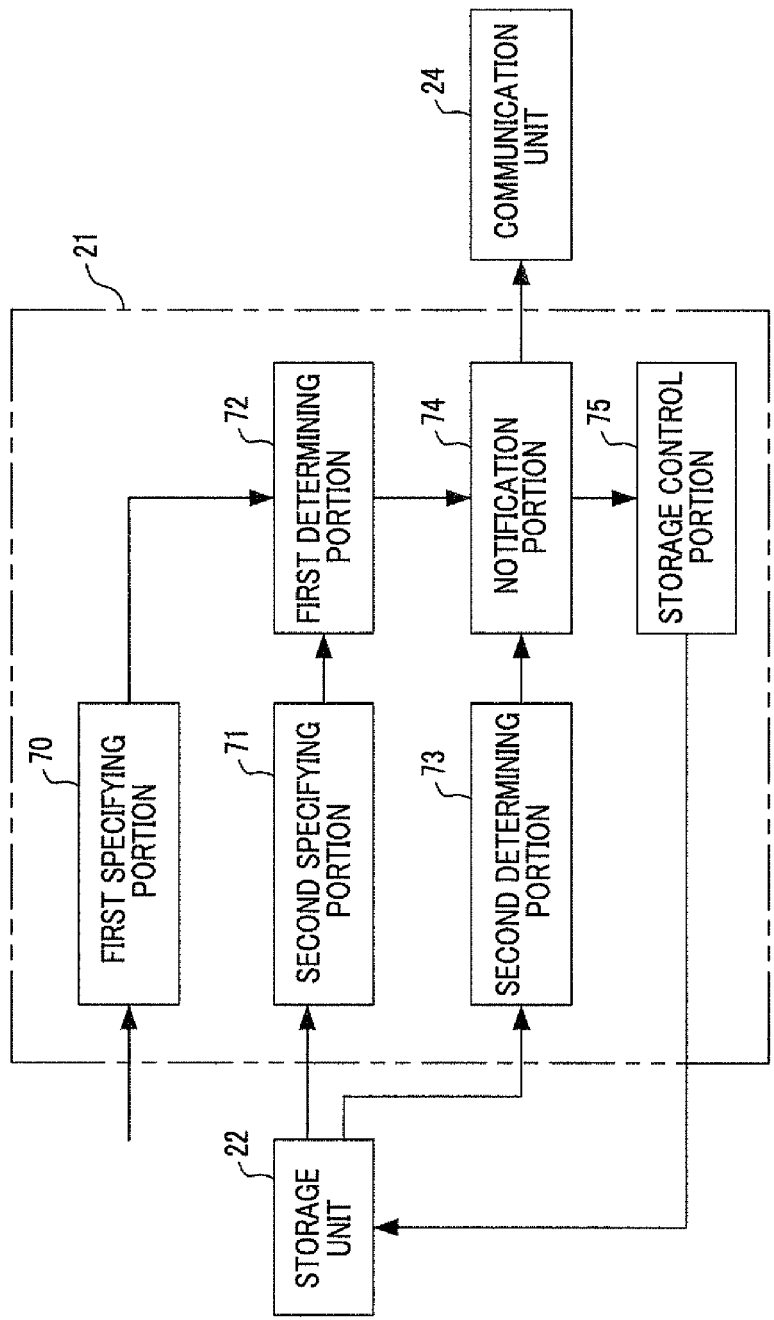

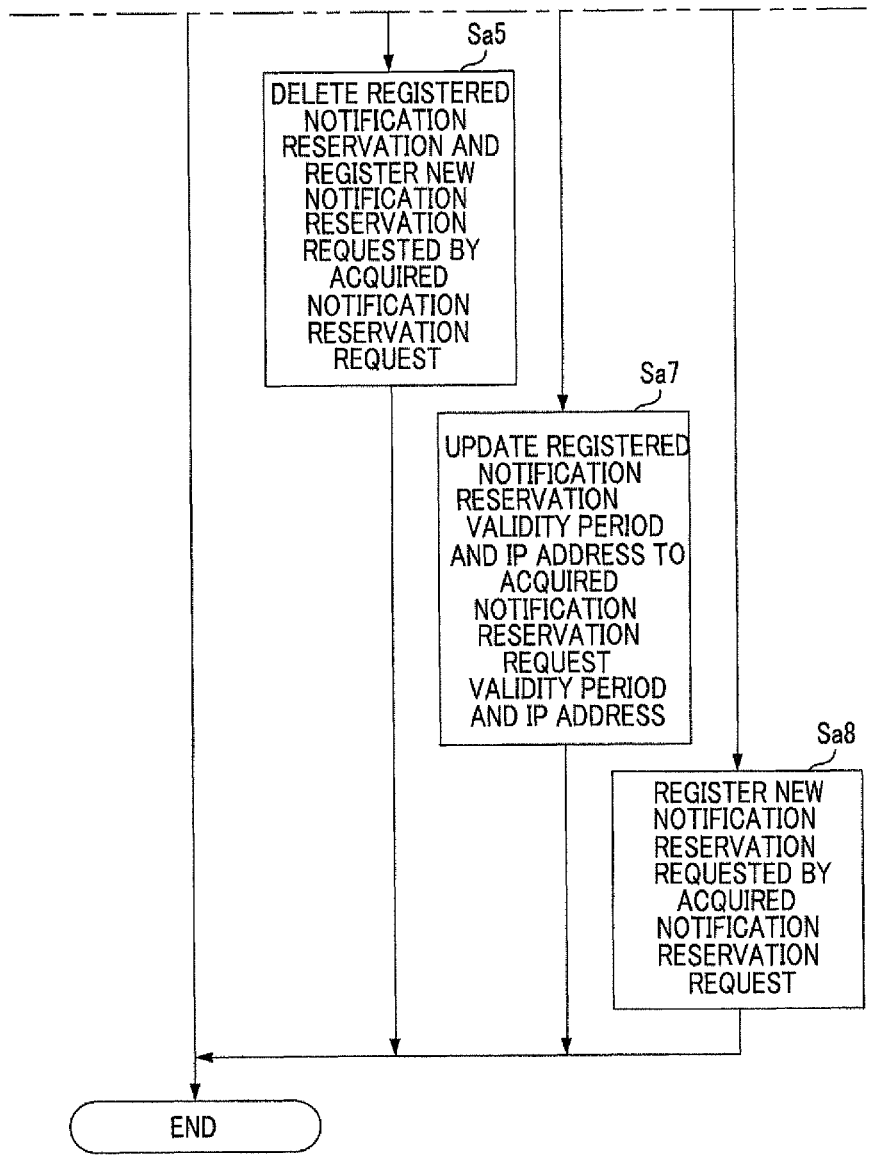

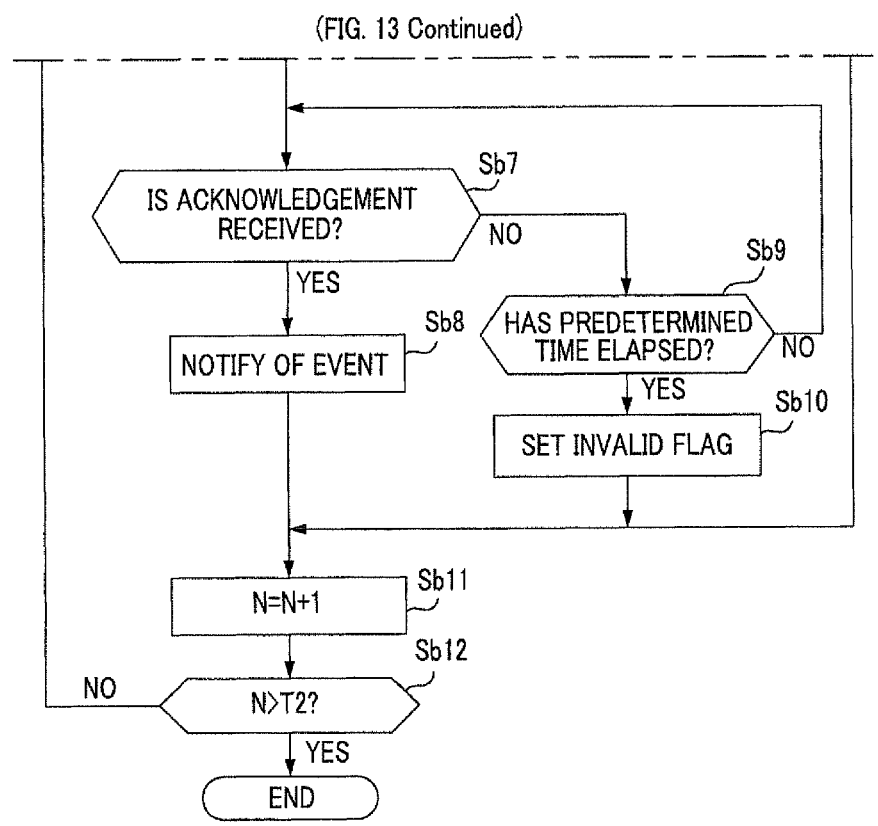

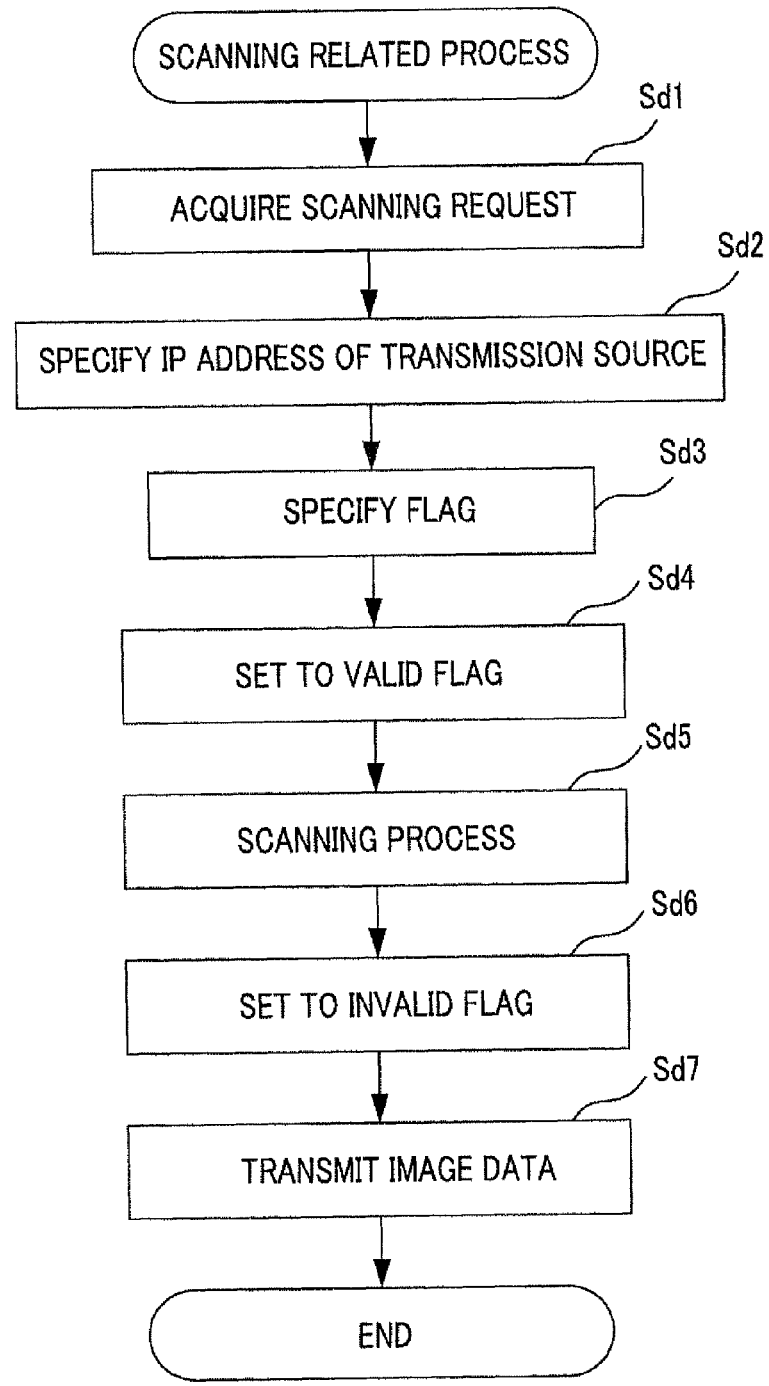

CONTROL DEVICE, IMAGE OUTPUT APPARATUS, IMAGE OUTPUT SYSTEM, NON-TRANSITORY COMPUTER READABLE MEDIUM, AND CONTROL METHOD

CROSS-REFERENCE TO RELATED APPLICATIONS

This application is based on and claims priority under 35 USC 119 from Japanese Patent Application No. 2012-067431 filed Mar. 23, 2012.

BACKGROUND (i) Technical Field

The present invention relates to a control device, an image output apparatus, an image output system, a non-transitory computer readable medium, and a control method.

(ii) Related Art

In order to realize a movement of a terminal in wide area LAN circumstances using the Internet or an intranet, it is necessary to specify a connection position in a network of the terminal. For this, it is necessary to detect connection and withdrawal of the terminal.

SUMMARY

According to an aspect of the invention, there is provided a control device including a first acquisition unit that acquires a first notification reservation request which requests a notification reservation of an event and includes first identification information for identifying a notification destination of the event; a second acquisition unit that acquires a second notification reservation request which requests a notification reservation of an event and includes second identification information for identifying a notification destination of the event; and a first controller that performs a control such that information regarding the notification reservation of the event requested by the second notification reservation request is stored in a memory according to a difference between the first identification information and the second identification information.

BRIEF DESCRIPTION OF THE DRAWINGS

Exemplary embodiments of the present invention will be described in detail based on the following figures, wherein:

FIG. 4 is a diagram illustrating an example of the data configuration of the notification reservation request;

FIG. 6 is a diagram illustrating an example of the data configuration of the notification reservation table;

FIG. 8 is a diagram illustrating an example of the management rule table;

FIG. 9 is a diagram illustrating a configuration of functions regarding a notification process;

FIG. 15 is a flowchart illustrating the scanning related process.

DETAILED DESCRIPTION

Hereinafter, exemplary embodiments of the invention will be described with reference to the drawings.

1. Exemplary Embodiments

1-1. Configuration

Figure 1:
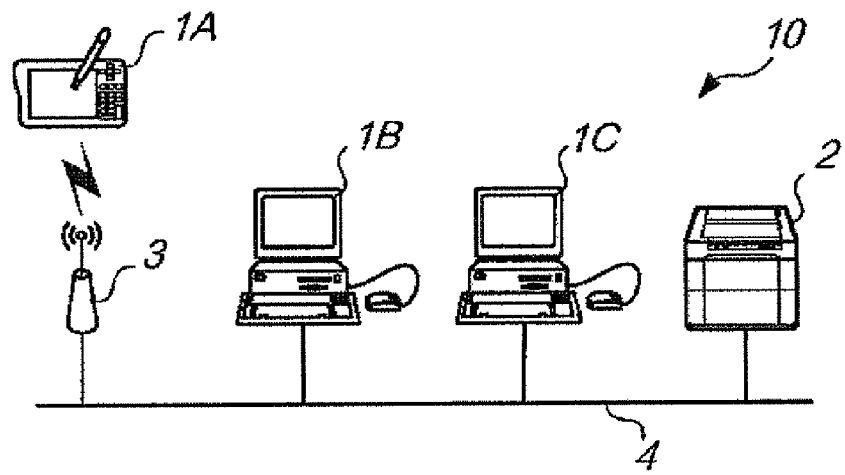
FIG. 1 is a diagram illustrating a configuration of an image output system.

FIG. 1 is a diagram illustrating a configuration of an image output system 10 according to an exemplary embodiment of the invention. As shown in the same figure, the image output system 10 includes plural client terminals 1A, 1B and 1C, an image output apparatus 2, and an access point 3. Among them, the client terminals 1B and 1C, the image output apparatus 2, and the access point 3 are connected to each other via a communication line 4 such as, for example, a Local Area Network (LAN).

The client terminal 1A is connected to other apparatuses via the access point 3 and the communication line 4. The access point 3 is a relay device which connects the client terminal 1A to the communication line 4. The image output system 10 is a system in which the image output apparatus 2 outputs images in response to an image output request received from the client terminals 1A, 1B and 1C.

Figure 2:
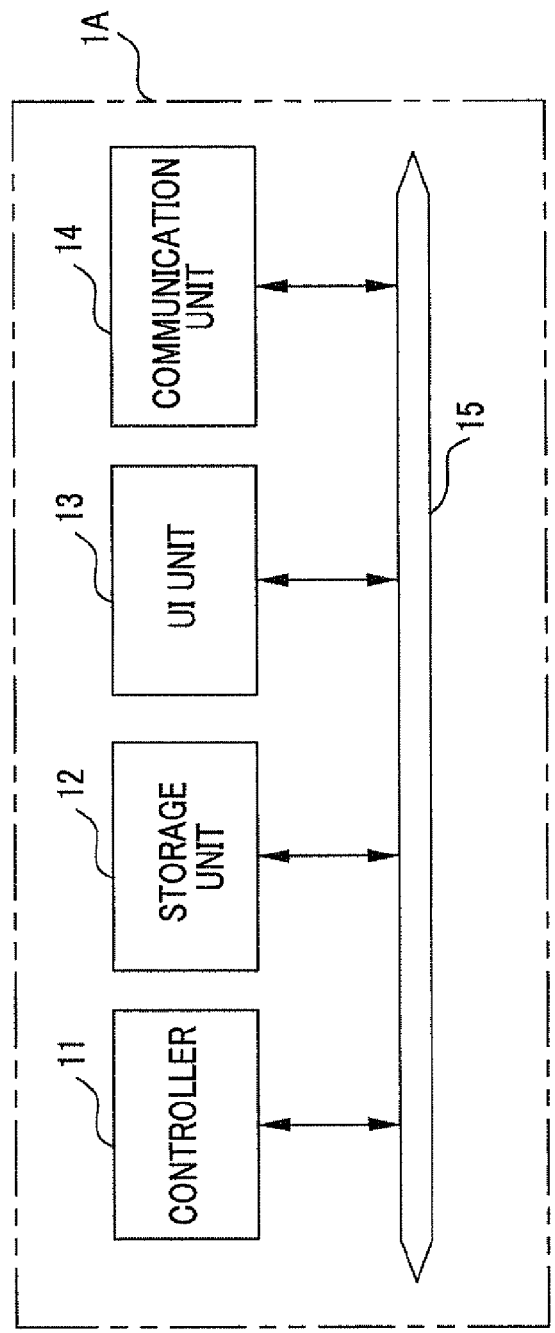
FIG. 2 is a diagram illustrating a hardware configuration of the client terminal.

FIG. 2 is a diagram illustrating a hardware configuration of the client terminal 1A. The client terminal 1A is, for example, a slate Personal Computer (PC), and includes a controller 11, a storage unit 12, a User Interface (UI) unit 13, and a communication unit 14. The constituent elements are connected to each other via a bus 15. The client terminal 1A is an example of the "transmission apparatus" related to the invention.

The controller 11 includes a Central Processing Unit (CPU), a Read Only Memory (ROM), and a Random Access Memory (RAM), and controls the respective units of the client terminal 1A by the CPU executing a program stored in the ROM or the storage unit 12.

The storage unit 12 is a storage device such as a Hard Disk Drive (HDD) and stores programs or a variety of data. The UI unit 13 is, for example, a touch screen, and displays information and receives an operation for the client terminal 1A. The communication unit 14 is, for example, a data communication card, and performs wireless communication with the access point 3.

Figure 3:
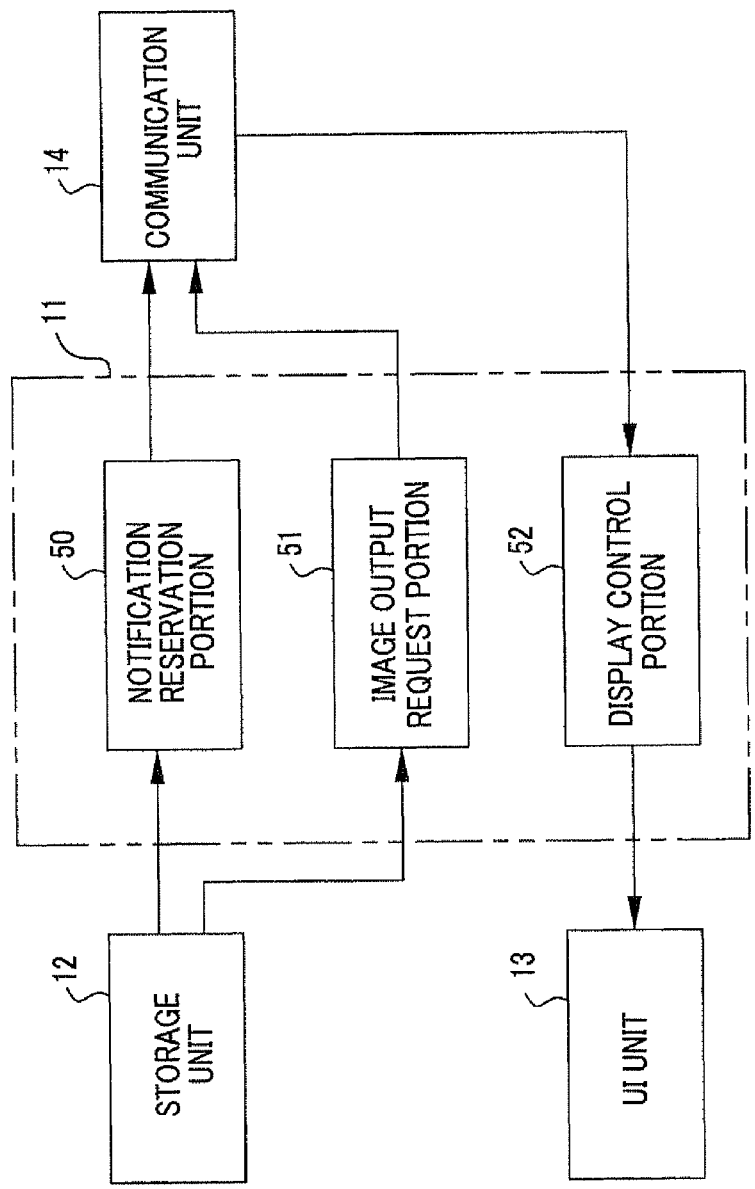
FIG. 3 is a diagram illustrating a configuration of functions realized by the controller.

FIG. 3 is a diagram illustrating a configuration of functions realized by the controller 11. The functions shown in the same figure are realized by the CPU executing the program stored in the ROM or the storage unit 12.

A notification reservation portion 50 shown in the same figure transmits a notification reservation request to the image output apparatus 2 via the communication unit 14. Here, the notification reservation request is information which requests the image output apparatus 2 to reserve a notification of an event regarding output of images performed by the corresponding apparatus. Here, the event regarding output of images performed by the corresponding apparatus refers to a problem in image output such as, for example, toner exhaustion or paper exhaustion, or completion of an image output process such as a printing process or a scanning process.

FIG. 4 is a diagram illustrating an example of the data configuration of the notification reservation request. As shown in the same figure, the notification reservation request includes a transmission destination Media Access Control (MAC) address, a transmission source MAC address, a transmission destination Internet Protocol (IP) address, a transmission source MAC address, a validity period, and the kind of event.

The transmission destination MAC address and the transmission destination IP address are respectively a MAC address and an IP address of the image output apparatus 2 in the exemplary embodiment. When a transmission source of the notification reservation request is the client terminal 1A, the transmission source MAC address and the transmission source IP address are respectively a MAC address and an IP address of the client terminal 1A. The transmission source MAC address and the transmission source IP address are respectively examples of the "first identification information" and the "second identification information" related to the invention.

The validity period indicates a validity period of the notification reservation. A value of, for example, "3600(sec)" or the like is set as an initial value of the validity period, the notification reservation is registered, and then the notification reservation is invalidated when time indicated by the value has elapsed.

The kind of event indicates the kind of event of which a notification is to be sent to a transmission source of the notification reservation request. The kind of event refers to, for example, a problem in image output, or completion of an image output process. Here, the problem in image output includes toner exhaustion, paper exhaustion, or the like as a detailed event. In addition, the completion of an image output process includes completion of a printing process or completion of a scanning process as a detailed event.

The notification reservation portion 50 transmits the above-described notification reservation request to the image output apparatus 2 when the client terminal 1A is activated or connected to the communication line 4. In addition, the image output apparatus 2 as a transmission destination of the notification reservation request may be, for example, searched on the communication line 4 by the client terminal 1A, and, as a result, may be detected and registered by the client terminal 1A. In addition, transmission timing of the notification reservation request is not limited to the time when the client terminal 1A is activated, and, for example, the notification reservation request may be transmitted at timing set by a user.

An image output request portion 51 shown in FIG. 3 transmits an image output request to the image output apparatus 2 via the communication unit 14. Here, the image output request is, for example, a printing request or a scanning request. The image output request includes an IP address of a transmission source which makes the request. The printing request further includes image data which is a target of image formation.

When a notification of an event is sent from the image output apparatus 2, a display control portion 52 shown in FIG. 3 displays the notification on the UI unit 13.

As above, the configuration related to the client terminal 1A has been described.

In addition, although the image output system 10 shown in FIG. 1 includes the client terminals 1B and 1C in addition to the client terminal 1A, these terminals have no configurations different from the configuration of the client terminal 1A except that they perform communication with the image output apparatus 2 in a wired manner, and thus description thereof will be omitted. In addition, in the following description, the client terminals 1A, 1B and 1C are collectively referred to as the "client terminal(s) 1" in a case where it is not necessary for them to be particularly differentiated from each other.

Figure 5:
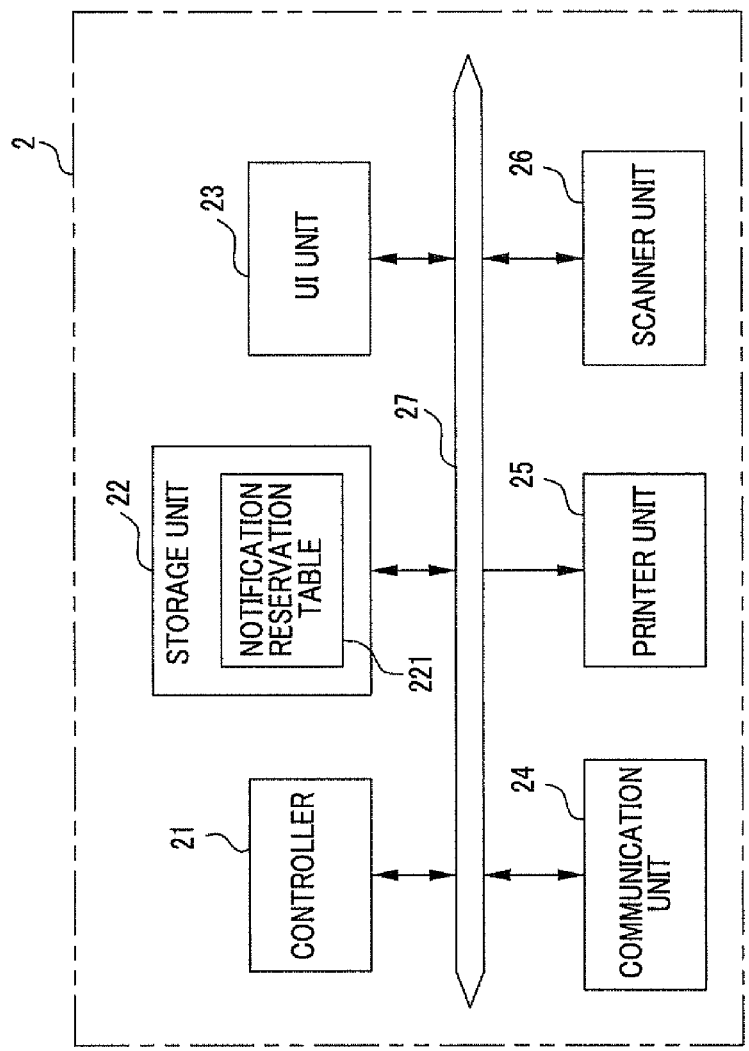
FIG. 5 is a diagram illustrating a hardware configuration of the image output apparatus.

FIG. 5 is a diagram illustrating a hardware configuration of the image output apparatus 2. As shown in the same figure, the image output apparatus 2 includes a controller 21, a storage unit 22, a User Interface (UI) unit 23, a communication unit 24, a printer unit 25, and a scanner unit 26. The constituent elements are connected to each other via a bus 27.

The controller 21 includes a Central Processing Unit (CPU), a Read Only Memory (ROM), and a Random Access Memory (RAM), and controls the respective units of the image output apparatus 2 by the CPU executing a program stored in the ROM or the storage unit 22. The controller 21 is an example of the "control device" related to the invention.

The storage unit 22 is a storage device such as a Hard Disk Drive (HDD) and stores programs or a variety of data. Particularly, the storage unit 22 stores a notification reservation table 221 for managing a notification reservation requested by the client terminal 1. FIG. 6 is a diagram illustrating an example of the data configuration of the notification reservation table 221. As shown in the same figure, the respective records forming the notification reservation table 221 are constituted by notification reservation IDs and information regarding a notification reservation. The information regarding notification reservation includes a valid/invalid flag, a transmission destination IP address, a transmission destination MAC address, a validity period, and the kind of event.

The notification reservation ID is identification information added to a notification reservation in the image output apparatus 2. The valid/invalid flag is information (variable) indicating whether a notification reservation is valid or invalid. Here, if the flag is "valid", a notification of an event is sent to the client terminal 1 according to a registered notification reservation. On the other hand, if the flag is "invalid", a notification of an event is not sent to the client terminal 1 according to a registered notification reservation.

In relation to setting of a valid or invalid flag when a notification reservation is registered, a valid flag is set if the notification reservation corresponds to a reservation of a notification of a problem in image output. On the other hand, if the notification reservation corresponds to a reservation of a notification of completion of an image output process, an invalid flag is set. Here, the reason why the invalid flag is set in the latter case is that a notification of completion of an image output process is sent only to the client terminal 1 which requests the image output process by a printing related process or a scanning related process described later.

In addition, in the exemplary embodiment, the meaning of "making a notification reservation valid" is that a valid flag is set in correlation with the notification reservation. On the contrary, the meaning of "making a notification reservation invalid" is that an invalid flag is set in correlation with the notification reservation.

The transmission destination IP address indicates an IP address of a client terminal which sends a notification of an event. The IP address is extracted from a notification reservation request which is transmitted. The transmission destination MAC address indicates a MAC address of a client terminal which sends a notification of an event. The MAC address is extracted from a notification reservation request which is transmitted. The validity period indicates a validity period of a notification reservation as described above. When the validity period has elapsed, the valid flag is changed to the invalid flag. A decrease in the validity period is started, for example, after the notification reservation is registered in the notification reservation table 221.

The storage unit 22 is an example of the "memory" related to the invention.

The UI unit 23 shown in FIG. 5 is, for example, a touch screen or a button, and receives an operation for the image output apparatus 2. The communication unit 24 is, for example, a communication interface card, and performs communication with external devices via the communication line 4. The communication unit 24 is an example of the "first reception unit" and the "second reception unit" related to the invention.

The printer unit 25 forms images on recording paper using an electrophotographic method. The printer unit 25 includes a photoconductor, an exposure device, a developing device, a transfer device, and a transport device (neither shown), and forms images on the basis of image data output from the controller 21. Specifically, the exposure device irradiates the photoconductor with laser light on the basis of the image data output from the controller 21, thereby forming an electrostatic latent image. Next, the developing device supplies toner accommodated in a toner cartridge to the electrostatic latent image, thereby forming a toner image. Next, the transfer device transfers the toner image onto the recording paper transported by the transport device. The printer unit 25 is an example of the "image output unit" related to the invention.

The scanner unit 26 optically reads an image of an original document placed on a platen glass (not shown) of the image output apparatus 2 and generates data of the read image. The scanner unit 26 is an example of the "image output unit" related to the invention.

Figure 7:
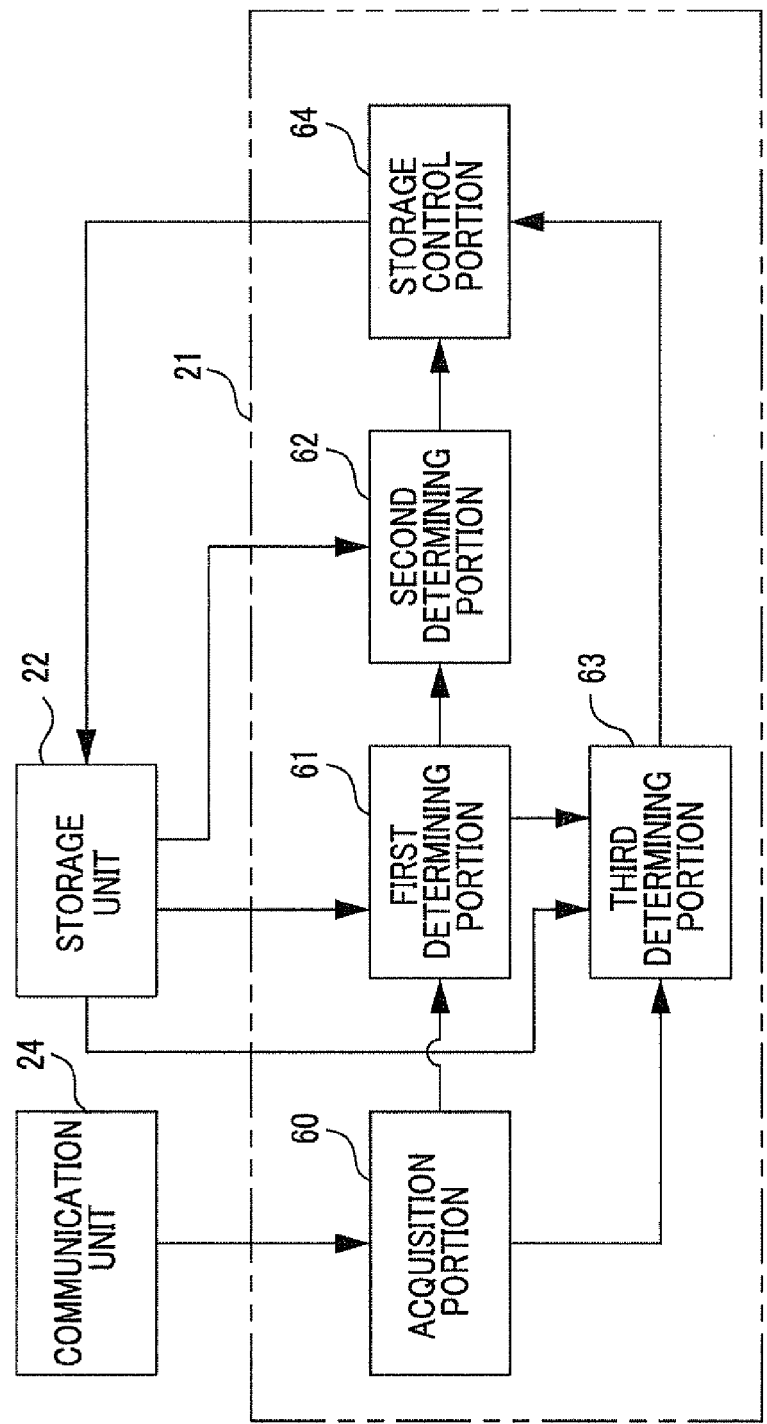
FIG. 7 is a diagram illustrating a configuration of functions regarding a notification reservation registering process.

FIG. 7 is a diagram illustrating a configuration of functions regarding a notification reservation registering process, realized by the above-described controller 21. The functions shown in the same figure are realized by the CPU executing the program stored in the ROM or the storage unit 22.

An acquisition portion 60 shown in the figure acquires a notification reservation request which is received via the communication unit 24. The acquisition unit 60 is an example of the "first acquisition unit" and the "second acquisition unit" related to the invention.

Next, a first determining portion 61 determines whether or not a transmission source IP address included in the acquired notification reservation request has already been registered in the notification reservation table 221. For example, in a case where a content registered in the notification reservation table 221 is a content as shown in FIG. 6, and the transmission source IP address included in the notification reservation request is "192.168.1.1", in the determination, having already been registered in the notification reservation table 221 is determined.

Next, if the determination result of the first determining portion 61 is affirmative, a second determining portion 62 determines whether or not the transmission source IP address included in the acquired notification reservation request is correlated with a transmission source MAC address included in the notification reservation request in the notification reservation table 221. For example, in a case where a content registered in the notification reservation table 221 is a content as shown in FIG. 6, when the transmission source IP address included in the notification reservation request is "192.168.1.1", and the transmission source MAC address included in the notification reservation request is "D4-85-64-B4-EE-EE", in the determination, it is determined that they are correlated.

Next, a third determining portion 63 determines whether or not the transmission source MAC address included in the acquired notification reservation request has already been registered in the notification reservation table 221 if the determination result of the first determining portion 61 is negative. For example, in a case where a content registered in the notification reservation table 221 is a content as shown in FIG. 6, and the transmission source MAC address included in the notification reservation request is "D4-85-64-B4-EE-EB", in the determination, having already been registered in the notification reservation table 221 is determined.

Next, a storage control portion 64 stores information regarding the notification reservation on the basis of the determination results of the second determining portion 62 and the third determining portion 63. The storage control portion stores the information regarding the notification reservation in the notification reservation table 221 according to a management rule table shown in FIG. 8.

Specifically, in a case where the transmission source IP address included in the acquired notification reservation request has already been registered in the notification reservation table 221, and the IP address is correlated with the transmission source MAC address included in the notification reservation request in the notification reservation table 221, the storage control portion 64 updates a validity period of a notification reservation which has the same IP address and MAC address as those in the acquired notification reservation request among notification reservations registered in the notification reservation table 221, to a validity period included in the notification reservation request.

For example, in a case where a content registered in the notification reservation table 221 is a content as shown in FIG. 6, the transmission source IP address included in the notification reservation request is "192.168.1.1", the transmission source MAC address included in the notification reservation request is "D4-85-64-E4-EE-EB", and a value of the validity period is "3600(sec)", validity periods of the notification reservations identified by the notification reservation IDs "1" and "2" are respectively updated to "3600(sec)".

A case where such a process is performed is, for example, a case where the client terminal 1 is temporarily withdrawn from the communication line 4, then returns to the communication line 4 again, and is allocated with an existing IP address from a Dynamic Host Configuration Protocol (DHCP) server (not shown). In this case, a new notification reservation is not registered but the existing validity period of the notification reservation is updated.

In addition, in a case where the transmission source IP address included in the acquired notification reservation request has already been registered in the notification reservation table 221, and the IP address is not correlated with the transmission source MAC address included in the notification reservation request in the notification reservation table 221, the storage control portion 64 deletes a notification reservation which has the same IP address as that in the acquired notification reservation request among notification reservations registered in the notification reservation table 221, and registers a new notification reservation requested by the acquired notification reservation request.

For example, in a case where a content registered in the notification reservation table 221 is a content as shown in FIG. 6, the transmission source IP address included in the notification reservation request is "192.168.1.1", and the transmission source MAC address included in the notification reservation request is "D4-85-64-B4-EE-EE", the notification reservations identified by the notification reservation Ins "1" and "2" are deleted.

A case where such a process is performed is, for example, a case where the client terminal 1A is temporarily withdrawn from the communication line 4, and then the client terminal. 1B is connected to the communication line 4 and is allocated with an IP address which has been allocated to the client terminal 1A from the DHCP server. In this case, a notification reservation related to the client terminal 1A is deleted, and a new notification reservation related to the client terminal 1B is registered.

Further, in a case where the transmission source IP address included in the acquired notification reservation request is not registered in the notification reservation table 221, but the transmission source MAC address is registered in the notification reservation table 221, the storage control portion 64 updates a validity period and an IP address of a notification reservation which has the same MAC address as those in the acquired notification reservation request among notification reservations registered in the notification reservation table 221, to a validity period and an IP address included in the notification reservation request.

For example, in a case where a content registered in the notification reservation table 221 is a content as shown in FIG. 6, the transmission source IP address included in the notification reservation request is "192.168.1.4", the transmission source MAC address included in the notification reservation request is "D4-85-64-B4-EE-EB", and a value of the validity period is "3600 (sec)", a transmission source IP address and a validity period of the notification reservations identified by the notification reservation IDs "1" and "2" are respectively updated to "192.168.1.4" and "3600 (sec)".

A case where such a process is performed is, for example, a case where the client terminal 1 is temporarily withdrawn from the communication line 4, then returns to the communication line 4 again, and is allocated with a new IP address from the DHCP server. In this case, a new notification reservation is not registered but the existing validity period and IP address of the notification reservation are updated.

In addition, in a case where neither of the transmission source IP address and the transmission source MAC address included in the acquired notification reservation request is registered in the notification reservation table 221, the storage control portion 64 registers a new notification reservation requested by the acquired notification reservation request.

For example, in a case where a content registered in the notification reservation table 221 is a content as shown in FIG. 6, the transmission source IP address included in the notification reservation request is "192.168.1.4", and the transmission source MAC address included in the notification reservation request is "D4-85-64-B4-EE-EE", no information is updated in relation to the existing notification reservation, and the new notification reservation requested by the acquired notification reservation request is registered.

A case where such a process is performed is, for example, a case where a completely new client terminal 1 is connected to the communication line 4.

The storage control portion 64 described above is an example of the "controller", the "first controller", and the "second controller" related to the invention.

As above, the functions regarding the notification reservation registering process shown in FIG. 7 has been described.

FIG. 9 is a diagram illustrating a configuration of functions regarding a notification process, realized by the above-described controller 21. The functions shown in the same figure are realized by the CPU executing the program stored in the ROM or the storage unit 22.

A first specifying portion 70 shown in the same figure specifies the kind of event generated in the image output apparatus 2. For example, the first specifying portion 70 specifies the kind of event of "a problem in image output" when toner exhaustion is generated in the image output apparatus 2.

Next, a second specifying portion 71 specifies the kind of event which is correlated with a variable N and is registered in the notification reservation table 221. Here, the variable N indicates the notification reservation ID registered in the notification reservation table 221. For example, in a case where a content registered in the notification reservation table 221 is a content as shown in FIG. 6, and a value of the variable N is "1", the second specifying portion 71 specifies the kind of event of "a problem in image output".

Next, a first determining portion 72 determines whether or not the kind of event specified by the first specifying portion 70 conforms to the kind of event specified by the second specifying portion 71. For example, in a case where a content registered in the notification reservation table 221 is a content as shown in FIG. 6, a value of the variable N is "1", and the kind of event specified by the first specifying portion 70 is a "problem in image output", the first determining portion 72 determines that the kinds of events conform to each other.

Next, a second determining portion 73 determines whether or not a flag which is registered in the notification reservation table 221 so as to be correlated with the variable N is a valid flag. For example, in a case where a content registered in the notification reservation table 221 is a content as shown in FIG. 6, and a value of the variable N is "1", the second determining portion 73 determines that the flag is a valid flag.

Next, the determination result by the first determining portion 72 is affirmative, and the determination result by the second determining portion 73 is also affirmative, a notification portion 74 sends a notification of an event to the client terminal 1. Specifically, the notification portion 74 sends a notification of an event to the client terminal 1 which is identified by a transmission destination IP address registered in the notification reservation table 221 so as to be correlated with the variable N.

When the notification of an event is sent, the notification portion 74 first transmits a connection establishment request to the client terminal 1 via the communication unit 24. In addition, the notification portion determines whether or not an acknowledgement to the connection establishment request is received, and, if the acknowledgement is received as a result of the determination, the notification portion 74 returns the acknowledgement to the client terminal 1, and then sends the notification of an event. Specifically, a message for notification of an event (for example, toner exhaustion) generated this time is transmitted to the corresponding client terminal 1. The notification portion 74 is an example of the "notification unit" related to the invention.

Next, a storage control portion 75 invalidates the notification reservation related to the client terminal 1 which is a notification destination when the notification by the notification portion 74 fails. Specifically, in a case where the notification portion 74 transmits the connection establishment request, and then elapsed time in a state where an acknowledgement is not received exceeds a threshold value T1 (for example, 30 (sec)), the storage control portion 75 updates the flag which is registered in the notification reservation table 221 so as to be correlated with the variable N to an invalid flag.

The storage control portion 75 is an example of the "first controller" related to the invention.

As above, the functions regarding the notification process shown in FIG. 9 have been described.

Figure 10:
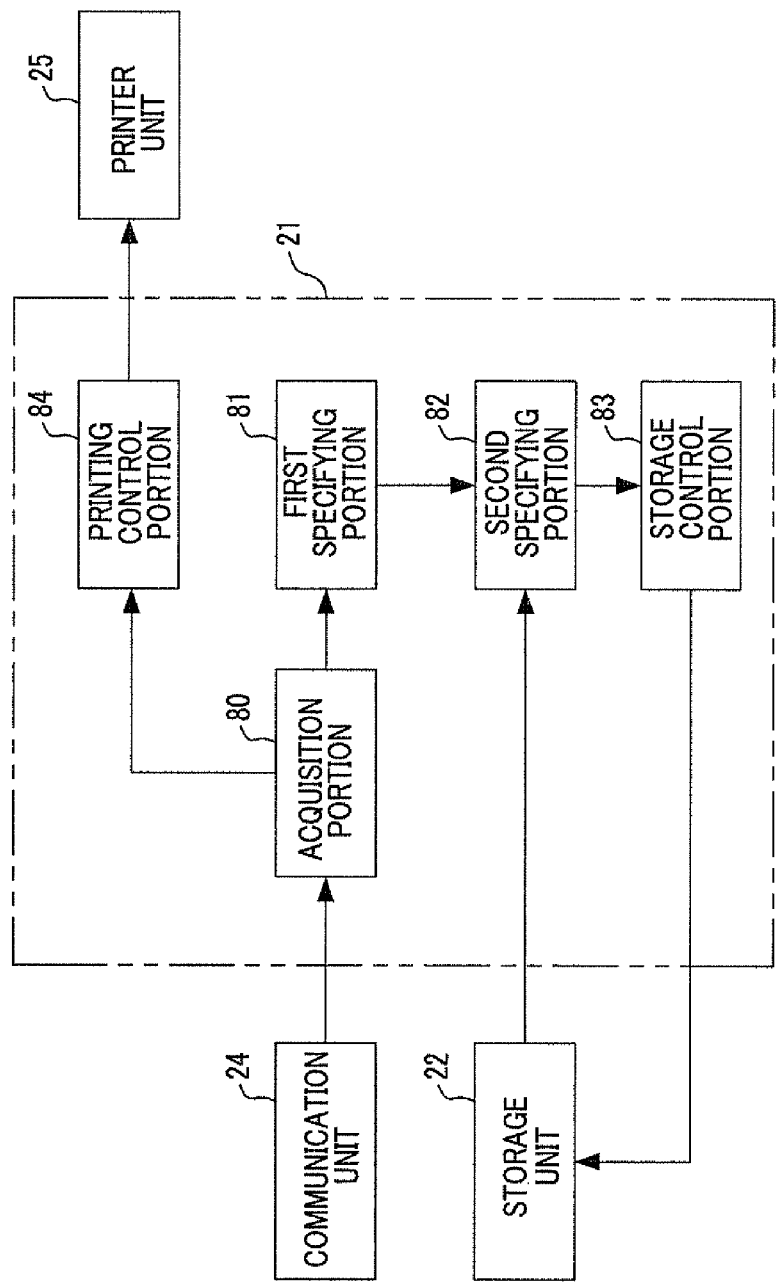
FIG. 10 is a diagram illustrating a configuration of functions regarding a printing related process.

FIG. 10 is a diagram illustrating a configuration of functions regarding a printing related process, realized by the above-described controller 21. The functions shown in the same figure are realized by the CPU executing the program stored in the ROM or the storage unit 22.

An acquisition portion 80 shown in the same figure acquires a printing request which is received via the communication unit 24. The acquisition portion 80 is an example of the "third acquisition unit" related to the invention.

A first specifying portion 81 specifies a transmission source IP address included in the acquired printing request.

Next, a second specifying portion 82 specifies a flag registered in the notification reservation table 221 such that the IP address specified by the first specifying portion 81 is correlated with the kind of event "completion of an image output process". For example, in a case where a content registered in the notification reservation table 221 is a content as shown in FIG. 6, and the specified IP address is "192.168.1.1", the second specifying portion 82 specifies a flag of the notification reservation identified by the notification reservation. ID "2".

Next, a storage control portion 83 sets the flag specified by the second specifying portion 82 to a valid flag. When a printing process is performed by a printing control portion 84 described later and a notification of completion of the process is sent, the storage control portion 83 changes the flag which is temporarily set to a valid flag to an invalid flag again. The storage control portion 83 is an example of the "first controller" related to the invention.

Next, the printing control portion 84 performs a printing process in response to the printing request acquired by the acquisition portion 80. Specifically, the printing control portion 84 controls the printer unit 25 so as to perform an image forming process corresponding to image data included in the printing request.

As above, the functions regarding the printing related process shown in FIG. 10 have been described.

Figure 11:
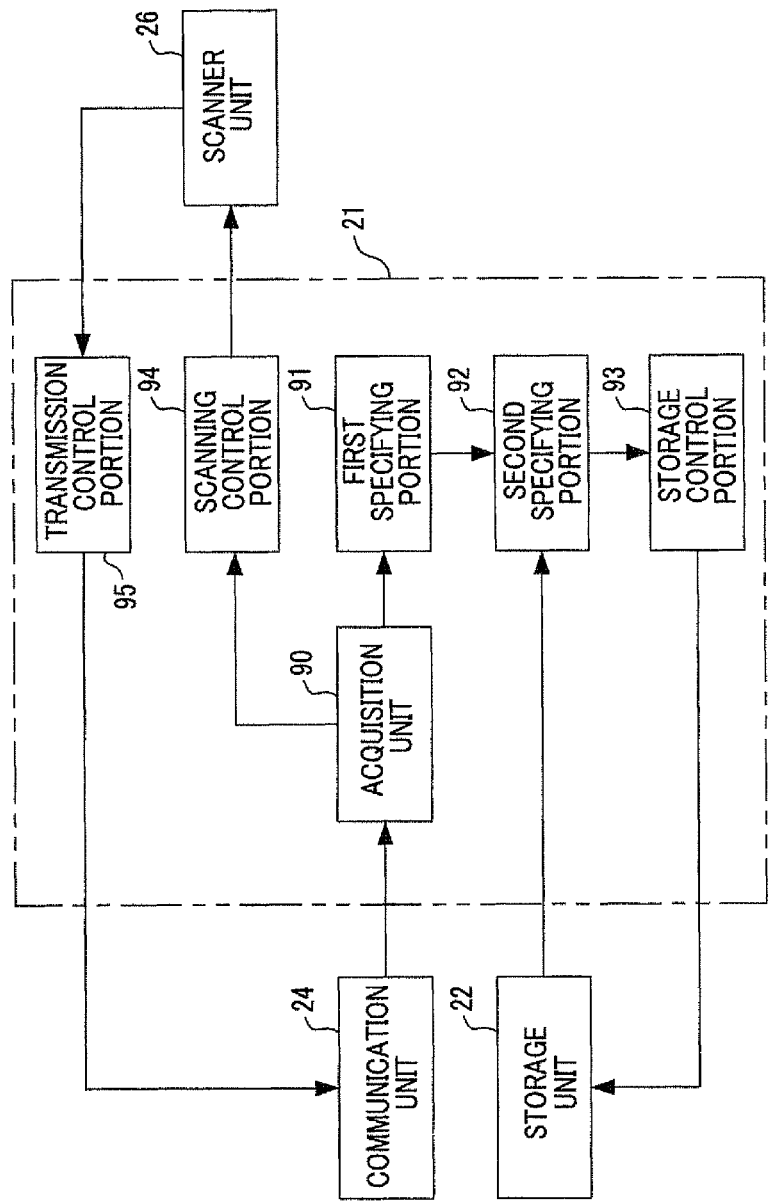
FIG. 11 is a diagram illustrating a configuration of functions regarding a scanning related process.

FIG. 11 is a diagram illustrating a configuration of functions regarding a scanning related process, realized by the above-described controller 21. The functions shown in the same figure are realized by the CPU executing the program stored in the ROM or the storage unit 22.

An acquisition portion 90 shown in the same figure acquires a scanning request which is received via the communication unit 24. The acquisition portion 90 is an example of the "third acquisition unit" related to the invention.

A first specifying portion 91 specifies a transmission source IP address included in the acquired scanning request.

Next, a second specifying portion 92 specifies a flag registered in the notification reservation table 221 such that the IP address specified by the first specifying portion 91 is correlated with the kind of event "completion of an image output process".

Next, a storage control portion 93 sets the flag specified by the second specifying portion 92 to a valid flag. When a scanning process is performed by a scanning control portion 94 described later and a notification of completion of the process is sent, the storage control portion 93 changes the flag which is temporarily set to a valid flag to an invalid flag again. The storage control portion 93 is an example of the "first controller" related to the invention.

Next, the scanning control portion 94 performs a scanning process in response to the scanning request acquired by the acquisition portion 90. Specifically, the scanning control portion 94 controls the scanner unit 26 so as to optically read an image of an original document placed on the platen glass and generate image data of the read image.

Next, a transmission control portion 95 transmits the image data generated by the scanning control portion 94 to the client terminal 1. Specifically, the transmission control portion 95 transmits the generated image data to the client terminal 1 which is identified by the IP address specified by the first specifying portion 91, via the communication unit 24.

As above, the functions regarding the scanning related process shown in FIG. 11 have been described.

1-2. Operations

Hereinafter, a variety of processes performed by the image output apparatus 2 will be described.

1-2-1. Notification Reservation Registering Process

First, a notification reservation registering process performed by the image output apparatus 2 will be described. The notification reservation registering process is performed when a notification reservation request is received by the image output apparatus 2. In addition, in the following description, it is assumed that the notification reservation request transmitted to the image output apparatus 2 includes the "problem in image output" and the "completion of an image output process" as the kind of event.

Figure 12:
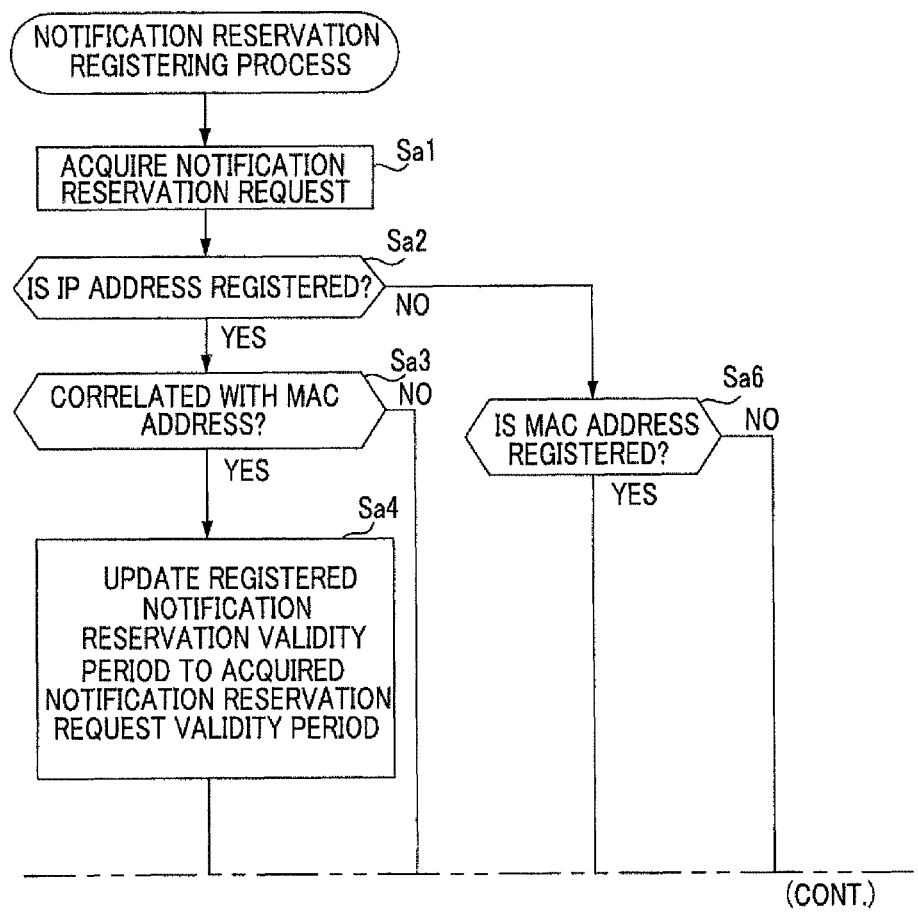
FIG. 12 is a flowchart illustrating the notification reservation registering process.

FIG. 12 is a flowchart illustrating the notification reservation registering process. In the process, first, the controller 21 of the image output apparatus 2 acquires a notification reservation request which is received via the communication unit 24 (step Sa1).

Next, the controller 21 determines whether or not a transmission source IP address included in the acquired notification reservation request has already been registered in the notification reservation table 221 (step Sa2). As a result of the determination, if the IP address has already been registered in the notification reservation table 221 (step Sa2; YES), the controller 21 performs a process in step Sa3. On the other hand, if the IP address is not registered in the notification reservation table 221 (step Sa2; NO), the controller 21 performs a process in step Sa6.

In step Sa3, the controller 21 determines whether or not the transmission source IP address included in the acquired notification reservation request is correlated with a transmission source MAC address included in the notification reservation request in the notification reservation table 221. As a result of the determination, if the IP address is correlated with the transmission source MAC address (step Sa3; YES), the controller 21 performs a process in step Sa4. On the other hand, if the IP address is not correlated with the transmission source MAC address (step Sa3; NO), the controller 21 performs a process in step Sa5.

In step Sa4, the controller 21 updates a validity period of a notification reservation which has the same IP address and MAC address as those in the acquired notification reservation request among notification reservations registered in the notification reservation table 221, to a validity period included in the notification reservation request.

In step Sa5, the controller 21 deletes a notification reservation which has the same IP address as that in the acquired notification reservation request among notification reservations registered in the notification reservation table 221, and registers a new notification reservation requested by the acquired notification reservation request.

In the determination in step Sa2, if it is determined that the transmission source IP address included in the acquired notification reservation request is not registered in the notification reservation table 221 (step Sa2; NO), the controller 21 determines whether or not the transmission source MAC address included in the acquired notification reservation request has already been registered in the notification reservation table 221 (step Sa6).

As a result of the determination, if the MAC address has already been registered in the notification reservation table 221 (step Sa6; YES), the controller 21 performs a process in step Sa7. On the other hand, if the MAC address is not registered in the notification reservation table 221 (step Sa6; NO), the controller 21 performs a process in step Sa8.

In step Sa7, the controller 21 updates a validity period and an IP address of a notification reservation which has the same MAC address as those in the acquired notification reservation request among notification reservations registered in the notification reservation table 221, to a validity period and an IP address included in the notification reservation request.

In step Sa8, the controller 21 registers a new notification reservation requested by the acquired notification reservation request.

As above, the notification reservation registering process has been described.

According to the above-described notification reservation registering process, a registering process is performed according to the preset management rule, and thereby double registration of a notification reservation is prevented. Specifically, if a MAC address included in the notification reservation request has already been registered in the notification reservation table 221, a new notification reservation is not registered but only registered information is updated.

In addition, even in a case where the MAC address included in the notification reservation request is not registered, if an IP address included in the request is registered, a registered notification reservation which has the IP address as a notification destination is deleted, and then a new notification reservation is registered. Therefore, a load on the memory and the CPU is reduced as compared with a configuration where such a registering process is not performed. In addition, efficiency of the notification process or use efficiency of the communication line is improved.

1-2-2. Notification Process

Next, a notification process performed by the image output apparatus 2 will be described. The notification process is performed when a preset event is generated in the image output apparatus 2.

Figure 13:
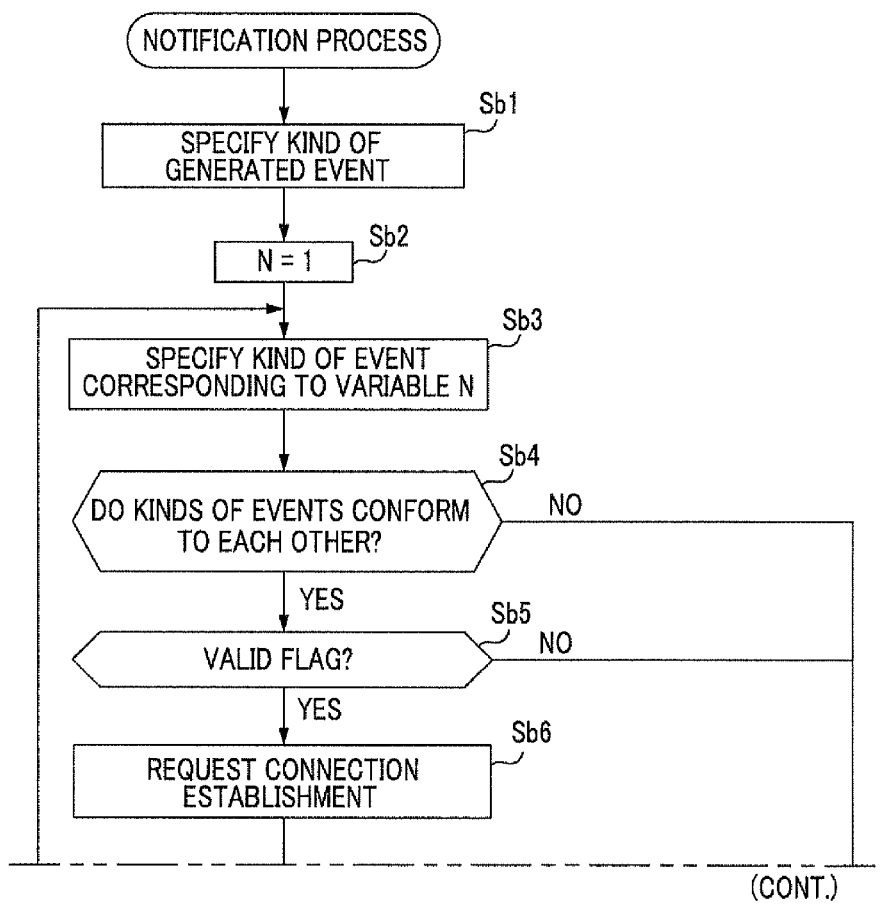
FIG. 13 is a flowchart illustrating the notification process.

FIG. 13 is a flowchart illustrating the notification process. In the process, first, the controller 21 of the image output apparatus 2 specifies the kind of event generated in the image output apparatus 2 (step Sb1).

Next, the controller 21 sets a value of the variable N to "1" (step Sb2). The variable N is a loop control variable used to refer to each item of the notification reservation table 221 shown in FIG. 6.

Next, the controller 21 specifies the kind of event which is correlated with a variable N and is registered in the notification reservation table 221 (step Sb3).

Next, the controller 21 determines whether or not the kind of event specified in step Sb3 conforms to the kind of event specified in step Sb1 (step Sb4). As a result of the determination, if the kinds of events conform to each other (step Sb4; YES), the controller 21 performs a process in step Sb5. On the other hand, as a result of the determination, if the kinds of events do not conform to each other (step Sb4; NO), the controller 21 performs a process in step Sb11.

In step Sb5, the controller 21 determines whether or not a flag which is registered in the notification reservation table 221 so as to be correlated with the variable N is a valid flag. As a result of the determination, if the flag is a valid flag (step Sb5; YES), the controller 21 performs a process in step Sb6. On the other hand, as a result of the determination, if the flag is an invalid flag (step Sb5; NO), the controller 21 performs a process in step Sb11.

In step Sb6, the controller 21 makes a request for connection establishment so as to send a notification of an event to the client terminal 1 (step Sb6). Specifically, the controller 21 transmits the connection establishment request to the client terminal 1 which is identified by a transmission destination IP address registered in the notification reservation table 221 so as to be correlated with the variable N, via the communication unit 24.

Next, the controller 21 determines whether or not an acknowledgement to the connection establishment request is received (step Sb7). As a result of the determination, if the acknowledgement is received (step Sb7; YES), the controller 21 returns the acknowledgement to the client terminal 1, and then sends the notification of an event (step Sb8). Specifically, a message for notification of an event (for example, toner exhaustion) generated this time is transmitted to the corresponding client terminal 1. In addition, the flow proceeds to step Sb11 where the controller 21 performs a process.

On the other hand, as a result of the determination, if the acknowledgement is not received (step Sb7; NO), the controller 21 determines whether or not elapsed time after the connection establishment request is transmitted exceeds a threshold value T1 (for example, 30(sec)) (step Sb9). As a result of the determination, if the elapsed time does not exceed the threshold value T1 (step Sb9; NO), the controller 21 performs the process in step Sb7 again. On the other hand, as a result of the determination, if the elapsed time exceeds the threshold value T1 (step Sb9; YES), the controller 21 updates the flag which is registered in the notification reservation table 221 so as to be correlated with the variable N to an invalid flag (step Sb10). In addition, the flow proceeds to step Sb11 where the controller 21 performs the process.

In step Sb11, the controller 21 adds "1" to the value of the variable N. Next, the controller 21 determines whether or not the value of the variable N is greater than a threshold value T2 (step Sb12). Here, the number of notification reservations registered in the notification reservation table 221 is set as the threshold value T2. As a result of the determination, if the value of the variable N is greater than the threshold value T2, the notification process finishes (step Sb12; YES). On the other hand, if the value of the variable N is equal to or smaller than the threshold value T2, the process in step Sb3 is performed again (step Sb12; NO).

As above, the notification process has been described.

According to the above-described notification process, even in a case where it is determined that the notification of an event is to be sent, if the notification may not be sent within a preset period, a notification reservation related to the client terminal 1 is invalidated. In addition, even if an event of which the client terminal 1 is to be notified is detected next time and thereafter, the notification is not sent to the client terminal 1 until the notification reservation which has been invalidated once becomes valid again. Therefore, according to the notification process, efficiency of the notification process or use efficiency of the communication line is improved as compared with a configuration in which such a flag process is not performed.

1-2-3 Printing Related Process

Next, a printing related process performed by the image output apparatus 2 will be described. The printing related process is performed when a printing request is received by the image output apparatus 2.

Figure 14:
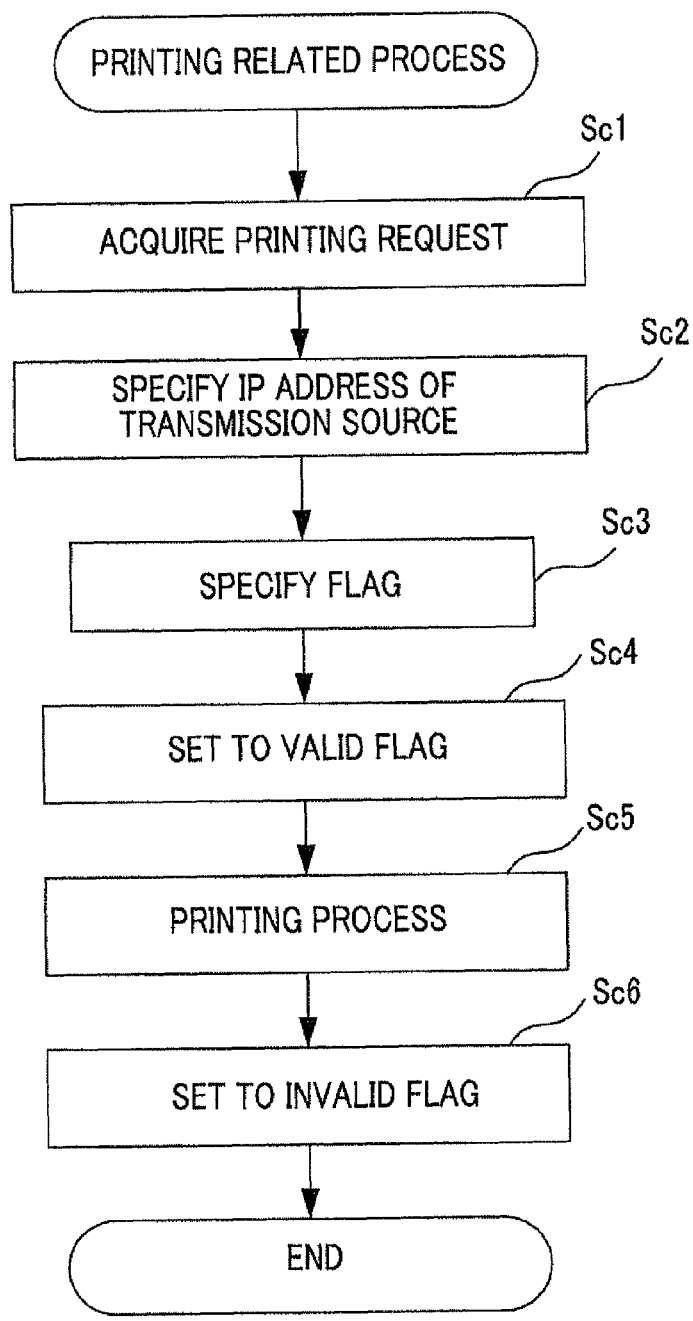
FIG. 14 is a flowchart illustrating the printing related process.

FIG. 14 is a flowchart illustrating the printing related process. In the process, first, the controller 21 of the image output apparatus 2 acquires a printing request which is received via the communication unit 24 (step Sc1).

Next, the controller 21 specifies a transmission source IP address included in the acquired printing request (step Sc2).

Next, the controller 21 specifies a flag registered in the notification reservation table 221 such that the specified IP address is correlated with the kind of event "completion of an image output process" (step Sc3).

Next, the controller 21 sets the specified flag to a valid flag (step Sc4).

Next, the controller 21 performs a printing process in response to the printing request acquired in step Sc1 (step Sc5). Specifically, the controller 21 controls the printer unit 25 so as to perform an image forming process corresponding to image data included in the printing request.

Next, the controller 21 sets the flag specified in step Sc3 to an invalid flag (step Sc6). This process is performed after the notification of completion of the printing process performed in step Sc5 is sent.

As above, the printing related process has been described.

According to the above-described printing related process, the notification reservation which is invalidated at the time of registration becomes valid only with the client terminal 1 by receiving the issuing of the printing request. In addition, when the printing process is completed, the notification of an event is sent only to the corresponding client terminal 1.

In contrast, in a specification in the related art, when the printing process is completed, a notification of the completion of the printing process is sent to all the client terminals 1 which have made a notification reservation of "completion of an image output process" regardless of which client terminal has requested the printing process.

According to the above-described printing related process, a notification of completion of the printing process is sent only to the client terminal 1 which has issued the printing request, and, even if the other client terminals 1 have made a notification reservation of "completion of an image output process", the notification is not sent thereto, and thus efficiency of the notification process or use efficiency of the communication line is improved.

1-2-4. Scanning Related Process

Next, a scanning related process performed by the image output apparatus 2 will be described. The scanning related process is performed when a scanning request is received by the image output apparatus 2. In addition, in the following description, it is assumed that an original document has already been placed on the platen glass of the image output apparatus 2.

FIG. 15 is a flowchart illustrating the scanning related process. In the process, first, the controller 21 of the image output apparatus 2 acquires a scanning request which is received via the communication unit 24 (step Sd1).

Next, the controller 21 specifies a transmission source IP address included in the acquired scanning request (step Sd2).

Next, the controller 21 specifies a flag registered in the notification reservation table 221 such that the specified IP address is correlated with the kind of event "completion of an image output process" (step Sd3).

Next, the controller 21 sets the specified flag to a valid flag (step Sd4).

Next, the controller 21 performs a scanning process in response to the scanning request acquired in step Sd1 (step Sd5). Specifically, the controller 21 controls the scanner unit 26 so as to optically read an image of an original document placed on the platen glass and generate image data of the read image.

Next, the controller 21 transmits the generated image data to the client terminal 1 (step Sd6). Specifically, the controller 21 transmits the generated image data to the client terminal 1 which is identified by the IP address specified in step Sd2, via the communication unit 24.

Next, the controller 21 sets the flag specified in step Sd3 to an invalid flag (step Sd7). This process is performed after the notification of completion of the scanning process performed in step Sd5 is sent.

As above, the scanning related process has been described.

According to the above-described scanning related process, the notification reservation which is invalidated at the time of registration becomes valid only with the client terminal 1 by receiving the issuing of the scanning request. In addition, when the scanning process is completed, the notification of an event is sent only to the corresponding client terminal 1. Therefore, according to the scanning related process, in the same manner as the above-described printing related process, efficiency of the notification process or use efficiency of the communication line is improved as compared with a specification in the related art.

2. Modified Examples

The exemplary embodiments may be modified as follows. In addition, the following modified examples may be combined with each other.

2-1. Modified Example 1

In the above exemplary embodiment, in a case where a notification reservation of completion of an image output process is registered, an invalid flag is temporarily set, and a valid flag is initially set after receiving issuing of an image output request. As a result, according to the exemplary embodiment, a notification of completion of an image output process is sent only to the client terminal 1 which has issued the image output request.

However, whether or not this function is used may be selected by a user. For example, a switch for selecting whether or not this function is used may be provided at the UI unit 23 of the image output apparatus 2.

As a result of operating the switch, if it is selected that the function is not used, the processes other than the process in step Sc5 are not performed in the above-described printing related process. In addition, in the above-described scanning related process, the processes other than the processes in steps Sd5 and Sd7 are not performed.

In this case, the controller 21 of the image output apparatus 2 may set not an invalid flag but a valid flag when a notification reservation of completion of an image output process is registered. In addition, the controller 21 may set a flag of a notification reservation of completion of an image output process which is registered at the time of operating the switch, to a valid flag.

2-2. Modified Example 2

In the above exemplary embodiment, when a validity period set in a notification reservation has elapsed, the notification reservation is set to be invalidated. However, instead of being invalidated, the notification reservation may be deleted. In addition, in the notification process related to the above exemplary embodiment, when the notification of an event fails, a notification reservation related to the client terminal 1 which is a notification destination is invalidated. However, here, instead of invalidating the notification reservation, the notification reservation may be deleted. Further, here, deleting the notification reservation refers to a state where a storage region of the storage unit 22 which is taken up by data indicating the notification reservation is made to be open and thereby other data may be written therein. In contrast, invalidating the notification reservation refers to setting an invalid flag in correlation with the notification reservation and does not mean opening of a storage region. However, both the concepts are common to the fact that a notification reservation is not made.

2-3. Modified Example 3

Although the kind of event is registered in the notification reservation table 221 in the above exemplary embodiment, a detailed event itself may be registered instead of the kind of event. For example, a detailed event such as "toner exhaustion" or "completion of a printing process" may be registered. In this case, the kind of event included in a notification reservation request may be changed to a detailed event. In addition, in steps Sb1 and Sb3 of the above-described notification process, not the kind of event but a detailed event may be specified. Further, in step Sb4, it may be determined whether not the kinds of events but detailed events conform to each other or not.

2-4. Modified Example 4

In the notification reservation registering process related to the above exemplary embodiment, a storage process for the notification reservation table 221 is performed based on a transmission source IP address and a transmission source MAC address included in a notification reservation request. However, here, the storage process is not performed based on both the transmission source IP address and the transmission source MAC address but the storage process may be performed based on either of them. For example, in a case where the storage process is performed only based on the transmission source MAC address, the processes in steps Sa2 to Sa5 in the notification reservation registering process may be omitted. In this case, the process in step Sa1 is performed, and then the process in step Sa6 is performed.

In addition, instead of either of the IP address and the MAC address, a Universal Unique Identifier (UUID) may be used.

2-5. Modified Example 5

In the above exemplary embodiment, when a notification reservation request is received by the image output apparatus 2, the controller 21 of the image output apparatus 2 may transmit a message indicating that the scanning function may be used to the client terminal 1 which is a transmission source thereof. In addition, although, in the above exemplary embodiment, a scanning request is transmitted to the image output apparatus 2 from the client terminal 1, the scanning request may be input using the UI unit 23 of the image output apparatus 2. In this case, when the scanning request is input, an IP address for identifying the client terminal 1 to which a notification of completion of a scanning process is to be sent may be designated together.

2-6. Modified Example 6

In the above exemplary embodiment, the program executed by the CPU of the image output apparatus 2 may be provided in a state of being stored in a storage medium such as a magnetic tape, a magnetic disk, a flexible disk, an optical disc, a magneto-optical disc, or a memory, and be installed in the image output apparatus 2. In addition, the program may be downloaded to the image output apparatus 2 via a communication line such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A control device comprising:
 a first acquisition unit that acquires a first notification reservation request which requests a notification reservation of an event and includes first identification information for identifying a notification destination of the event;
 a second acquisition unit that acquires a second notification reservation request which requests a notification reservation of an event and includes second identification information for identifying a notification destination of the event;
 a first controller that performs a control such that information regarding the notification reservation of the event requested by the second notification reservation request is stored in a memory according to a difference between the first identification information and the second identification information; and
 a notification unit that sends a notification of the event to a notification destination which is identified by the second identification information on the basis of the information regarding the notification reservation of the event requested by the second notification reservation request, stored in the memory,
 wherein, when the notification by the notification unit fails, the first controller performs a control such that the notification unit does not send the notification on the basis of the information regarding the notification reservation of the event requested by the second notification reservation request, stored in the memory,
 the control device further comprising a third acquisition unit that acquires an image output request which requests an image output apparatus outputting images to output images and includes the second identification information,
 wherein, when the information regarding the notification reservation of the event requested by the second notification reservation request is stored in the memory, the first controller performs a control such that information indicating that the reservation is invalid is stored so as to be correlated with the information regarding the notification reservation,
 wherein, when the image output request is acquired by the acquisition unit, the first controller performs a control such that the information indicating that the reservation is invalid is updated to information indicating that the reservation is valid in the memory, and wherein, when the information regarding the notification reservation of the event requested by the second notification reservation request, stored in the memory, is correlated not with the information indicating that the reservation is invalid but with the information indicating that the reservation is valid, the notification unit sends a notification of the event to a notification destination identified by the second identification information on the basis of the information regarding the notification reservation of the event.

2. A control device comprising:

a first acquisition unit that acquires a first notification reservation request which requests a notification reservation of an event and includes first identification information for identifying a notification destination of the event;

a second acquisition unit that acquires a second notification reservation request which requests a notification reservation of an event and includes second identification information for identifying a notification destination of the event;

a first controller that performs a control such that information regarding the notification reservation of the event requested by the second notification reservation request is stored in a memory according to a difference between the first identification information and the second identification information; and a second controller that performs a control such that information regarding the notification reservation of the event requested by the first notification reservation request is stored in the memory, wherein, when the difference between the first identification information and the second identification information satisfies a preset condition, the first controller performs a control such that the information regarding the notification reservation of the event requested by the first notification reservation request, stored in the memory, is deleted, and performs a control such that the information regarding the notification reservation of the event requested by the second notification reservation request is stored in the memory, the control device further comprising a notification unit that sends a notification of the event to a notification destination which is identified by the second identification information on the basis of the information regarding the notification reservation of the event requested by the second notification reservation request, stored in the memory, wherein, when the notification by the notification unit fails, the first controller performs a control such that the notification unit does not send the notification on the basis of the information regarding the notification reservation of the event requested by the second notification reservation request, stored in the memory, the control device further comprising a third acquisition unit that acquires an image output request which requests an image output apparatus outputting images to output images and includes the second identification information, wherein, when the information regarding the notification reservation of the event requested by the second notification reservation request is stored in the memory, the first controller performs a control such that information indicating that the reservation is invalid is stored so as to be correlated with the information regarding the notification reservation, wherein, when the image output request is acquired by the acquisition unit, the first controller performs a control such that the information indicating that the reservation is invalid is updated to information indicating that the reservation is valid in the memory, and wherein, when the info nation regarding the notification reservation of the event requested by the second notification reservation request, stored in the memory, is correlated not with the information indicating that the reservation is invalid but with the information indicating that the information is valid, the notification unit sends a notification of the event to a notification destination identified by the second identification information on the basis of the information regarding the notification reservation of the event.

3. A control device comprising:

a first acquisition unit that acquires a first notification reservation request which requests a notification reservation of an event and includes first identification information for identifying a notification destination of the event;

a second acquisition unit that acquires a second notification reservation request which requests a notification reservation of an event and includes second identification information for identifying a notification destination of the event;

a first controller that performs a control such that information regarding the notification reservation of the event requested by the second notification reservation request is stored in a memory according to a difference between the first identification information and the second identification information; and a second controller that performs a control such that information regarding the notification reservation of the event requested by the first notification reservation request is stored in the memory, wherein the first identification information includes a first Internet Protocol (IP) address and a first Media Access Control (MAC) address, wherein the second identification information includes a second IP address and a second MAC address, wherein, when a difference between the first IP address and the second IP address satisfies a preset condition, and a difference between the first MAC address and the second MAC address does not satisfy a preset condition, the first controller performs a control such that the information regarding the notification reservation of the event requested by the first notification reservation request, stored in the memory, is deleted, and performs a control such that the information regarding the notification reservation of the event requested by the second notification reservation request is stored in the memory, and wherein, when the difference between the first MAC address and the second MAC address satisfies the preset condition, the first controller performs a control such that the information regarding the notification reservation of the event requested by the first notification reservation request, stored in the memory, is updated to the information regarding the notification reservation of the event requested by the second notification reservation request, the control device further comprising a notification unit that sends a notification of the event to a notification destination which is identified by the second identification information on the basis of the information regarding the notification reservation of the event requested by the second notification reservation request, stored in the memory, wherein, when the notification by the notification unit fails, the first controller performs a control such that the notification unit does not send the notification on the basis of the information regarding the notification reservation of the event requested by the second notification reservation request, stored in the memory, the control device further comprising a third acquisition unit that acquires an image output request which requests an image output apparatus outputting images to output images and includes the second identification information, wherein, when the information regarding the notification reservation of the event requested by the second notification reservation request is stored in the memory, the first controller performs a control such that information indicating that the reservation is invalid is stored so as to be correlated with the information regarding the notification reservation, wherein, when the image output request is acquired by the acquisition unit, the first controller performs a control such that the information indicating that the reservation is invalid is updated to information indicating that the reservation is valid in the memory, and wherein, when the information regarding the notification reservation of the event requested by the second notification reservation request, stored in the memory, is correlated not with the information indicating that the reservation is invalid but with the information indicating that the information is valid, the notification unit sends a notification of the event to a notification destination identified by the second identification information on the basis of the information regarding the notification reservation of the event.

* * * * *